United States Patent

Herzig et al.

[11] Patent Number: 5,866,666
[45] Date of Patent: Feb. 2, 1999

[54] SILOXANE COPOLYMERS CONTAINING VINYLOXY GROUPS, THEIR PREPARATION AND THEIR USE

[75] Inventors: Christian Herzig, Taching; Alfred Rengstl, Reischach, both of Germany

[73] Assignee: Wacker-Chemie GmbH, Germany

[21] Appl. No.: 778,796

[22] Filed: Jan. 3, 1997

Related U.S. Application Data

[63] Continuation of Ser. No. 313,191, Oct. 12, 1994, abandoned.

[30] Foreign Application Priority Data

May 7, 1992 [DE] Germany .......................... 42 15 076.0

[51] Int. Cl.$^6$ .................................................. C08G 77/04
[52] U.S. Cl. .............................. 528/28; 528/31; 528/15; 528/29; 522/99; 556/445
[58] Field of Search ................................. 528/25, 31, 15, 528/29; 522/99; 556/445

[56] References Cited

U.S. PATENT DOCUMENTS

| | | | |
|---|---|---|---|
| 4,292,434 | 9/1981 | Lindner et al. | 556/479 |
| 4,617,238 | 10/1986 | Crivello et al. | 428/452 |
| 4,707,503 | 11/1987 | Itoh et al. | 522/99 |
| 4,764,577 | 8/1988 | Inoue et al. | 525/409 |
| 4,877,854 | 10/1989 | Hattori et al. | 528/15 |
| 5,057,549 | 10/1991 | Herzig et al. | 522/99 |
| 5,145,915 | 9/1992 | Weitemeyer et al. | 525/403 |
| 5,231,157 | 7/1993 | Herzig et al. | 528/15 |
| 5,270,423 | 12/1993 | Brown et al. | 528/15 |

FOREIGN PATENT DOCUMENTS

| | | |
|---|---|---|
| 0105341 | 1/1987 | European Pat. Off. . |
| 0110370 | 4/1987 | European Pat. Off. . |
| 0476426 | 3/1992 | European Pat. Off. . |
| 4142327 | 6/1993 | Germany . |

OTHER PUBLICATIONS

Siloxane Copolymers containing alkenylox groups . . . WA–8929–S, 1989.

"Siloxane Copolymers containing alkenyloxy groups, their preparation and their use", WA–8929–S, 1989.

Canadian Patent Application "Siloxane copolymers containing alkenyloxy groups, their preparation and their use", by Wacker–Chemie GmbH (Wa 8929–S) 176221q Vinyloxypropltrimethylsiloxysilane, Chemical Abstracts.

English Derwent Abstract 93–206310/26.

*Primary Examiner*—Margaret W. Glass
*Attorney, Agent, or Firm*—Brooks & Kushman P.C.

[57] ABSTRACT

The present invention relates to siloxane copolymers containing vinyloxy groups and a method of preparing the siloxane copolymers. The copolymers of the present invention are useful for the production of coatings which can be crosslinked by light and radiation-curable printing inks.

8 Claims, No Drawings

SILOXANE COPOLYMERS CONTAINING VINYLOXY GROUPS, THEIR PREPARATION AND THEIR USE

The application is a continuation of application Ser. No. 08/313,191, filed on Oct. 12, 1994.

The invention relates to siloxane copolymers containing vinyloxy groups and to a process for their preparation. The invention furthermore relates to compositions which can be crosslinked by light and are based on siloxane copolymers containing vinyloxy groups.

Organopolysiloxanes which contain, per molecule, at least one Si-bonded vinyloxy-functional group of the formula $$H_2C=CH-O-G-$$

wherein G is an alkylene radical or an alkylene radical which is interrupted by at least one divalent hetero radical, such as —O—, a divalent phenylene radical or a substituted divalent phenylene radical, or combinations of such hetero radicals, are known from EP-B 105 341. These organopolysiloxanes are obtained by preparation of a compound having an allyl and a vinyloxy group and addition of this compound onto the SiH groups of the organopolysiloxanes, hydrosilylation taking place only on the allyl group. EP-B 105 341 furthermore describes compositions which can be crosslinked by light and comprise the abovementioned organopolysiloxanes, and also onium salts which catalyse the cationic polymerisation of these organopolysiloxanes.

A silane which has one vinyloxypropyl group and at least one trimethylsiloxy group and which is obtained by hydrosilylation of allyl vinyl ether with a silane containing trimethylsiloxy groups, addition taking place on the allyl group, is known for the production of plastic lenses from Chemical Abstracts 107, 176221q.

Organopolysiloxanes which contain propenyloxy groups and siloxane copolymers which contain propenyloxy groups are described in U.S. Pat. No. 5,057,549 and CA-A 20 35 396, these compounds being prepared in a two-stage process by addition of compounds having two or more than two allyloxy groups onto SiH groups of organopolysiloxanes and subsequent conversion of the allyloxy groups into the propenyloxy groups by addition on the double bond.

Organopolysiloxanes which have any number of substituted vinyl ether groups and are prepared by hydrosilylation, that is to say by reaction of an organopolysiloxane containing SiH groups with a polyoxyalkylene ether, for example of the formula

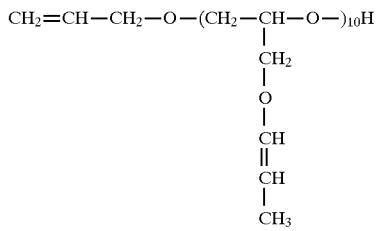

addition taking place on the allyl group, are known from U.S. Pat. No. 5,145,915.

There was the object of providing siloxane copolymers which contain vinyloxy groups and can be prepared in a simple process, the process allowing more than one vinyloxy group to be introduced on one silicon atom. There was furthermore the object of providing siloxane copolymers which contain vinyloxy groups and crosslink particularly rapidly under the action of light, in particular ultraviolet light, with cationic polymerisation. This object is achieved by the invention.

The invention relates to siloxane copolymers which contain vinyloxy groups and comprise
(a) siloxane units of the formula $$R_a Si(OR^1)_b O_{\frac{4-(a+b)}{2}} \qquad (I)$$

wherein R denotes identical or different, optionally halogenated hydrocarbon radicals having 1 to 18 carbon atom(s) per radical, $R^1$ denotes identical or different alkyl radicals having 1 to 4 carbon atom(s) per radical, which can be substituted by an ether oxygen atom, a is 0, 1, 2 or 3, b is 0, 1, 2 or 3 and the sum of a+b is not greater than 3, (b) at least one unit per molecule chosen from the group comprising units of the formula $$GR_c SiO_{\frac{4-(c+1)}{2}} \qquad (II)$$

$$O_{\frac{4-(c+1)}{2}} R_c Si-G^1-SiR_c O_{\frac{4-(c+1)}{2}} \qquad (III)$$

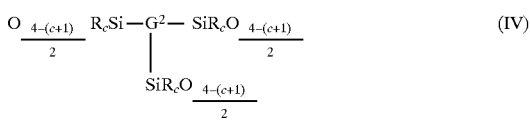

and

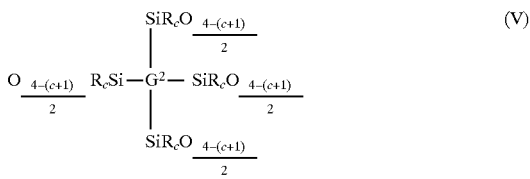

wherein R has the meaning given above for this radical,
c is 0, 1 or 2,
G denotes a radical of the formula $$-CH_2CH_2OY(OCH=CH_2)_{x-1}$$

wherein

Y denotes a divalent, trivalent, tetravalent, pentavalent or hexavalent hydrocarbon radical having 1 to 20 carbon atoms per radical, which can be substituted by groups of the formula

—OH

—$OR^2$ (wherein $R^2$ denotes an alkyl radical having 1 to 6 carbon atom(s) per radical)

—$OSiR_3^3$ (wherein $R^3$ denotes a methyl, ethyl, isopropyl, tert-butyl or phenyl radical)

(wherein $R^2$ has the meaning given above for this radical)

or

—X (wherein X denotes a halogen atom) or can be interrupted by at least one oxygen atom, one carboxyl or one carbonyl group, and x is 2, 3, 4, 5 or 6, $G^1$ denotes a radical of the formula

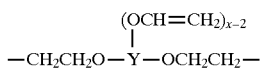

$G^2$ denotes a radical of the formula

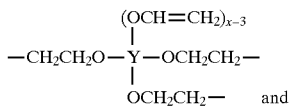

$G^3$ denotes a radical of the formula

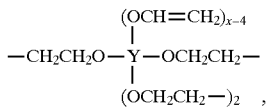

wherein Y and x have the meaning given above for these symbols.

The siloxane copolymers containing vinyloxy groups preferably comprise siloxane units of the formula (I), at least one siloxane unit of the formula (II) per molecule and at least one unit selected from the group comprising the units of the formulae (III), (IV) and (V) per molecule.

The invention furthermore relates to a process for the preparation of the siloxane copolymers containing vinyloxy groups, characterized in that an organic compound (1) containing more than one vinyloxy group, of the general formula $$Y(OCH=CH_2)_x \qquad (1)$$

where Y and x have the meaning given above for these symbols is reacted with an organopolysiloxane (2) having at least one Si-bonded hydrogen atom per molecule, in the presence of a catalyst (3) which promotes the addition of Si-bonded hydrogen onto an aliphatic double bond, the ratio employed of aliphatic double bond in the organic compound (1) to Si-bonded hydrogen in the organopolysiloxane (2) is such that siloxane copolymers containing vinyloxy groups, having on average at least one vinyloxy group of the formula

—OCH=CH$_2$ are obtained.

In the prior art, as in the abovementioned EP-B 105 341, neither are siloxane copolymers containing vinyloxy groups described nor was it to be expected that such copolymers can be obtained by addition (hydrosilylation) of SiH groups onto vinyloxy groups, since according to EP-B 105 341, the introduction of a vinyloxy group into an organopolysiloxane is achieved only by hydrosilylation of a compound which contains an allyl group and a vinyloxy group, the addition taking place on the allyl group.

Preferably, x is 2, 3 or 4 and Y is a divalent, trivalent or tetravalent radical.

The organopolysiloxanes according to the invention which contain vinyloxy groups preferably have a viscosity of 5 to 5×10$^5$ mPa•s at 25° C., preferably 50 to 50000 mPa•s at 25° C.

The siloxane content in the siloxane copolymers according to the invention which contain vinyloxy groups is preferably 20 to 90% by weight, based on the total weight of siloxane copolymers containing vinyloxy groups.

Examples of radicals R are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals; xylyl radicals and ethylphenyl radicals; and aralkyl radicals, such as the benzyl radical and the α- and β-phenylethyl radical. The methyl radical is preferred.

Examples of halogenated radicals R are halogenoalkyl radicals, such as the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radical.

Examples of alkyl radicals $R^1$ are the methyl, ethyl, n-propyl, iso-propyl, 1-n-butyl, 2-n-butyl, iso-butyl and tert-butyl radical. The methyl and ethyl radical are preferred. Examples of alkyl radicals $R^1$ which are substituted by an ether oxygen atom are the methoxyethylene and ethoxyethylene radical.

Examples of alkyl radicals $R^2$ are the methyl, ethyl, n-propyl, iso-propyl, 1-n-butyl, 2-n-butyl, iso-butyl, tert-butyl, n-pentyl, iso-pentyl, neo-pentyl and tert-pentyl radical and hexyl radicals, such as the n-hexyl radical.

Preferred siloxane copolymers containing vinyloxy groups are those which comprise
(a) siloxane units of the formula $$R_2SiO \qquad (I'),$$

(b) per molecule, at least two siloxane units of the formula $$GR_2SiO_{1/2} \qquad (II')$$

and per molecule, at least one unit of the formula $$O_{1/2}R_2SiG^1SiR_2O_{1/2} \qquad (III')$$

wherein R, G and $G^1$ have the meaning given above for these radicals.

Examples of the organic compound (1) which contains more than one vinyloxy group and is employed in the process according to the invention are those of the formula

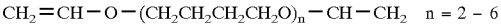

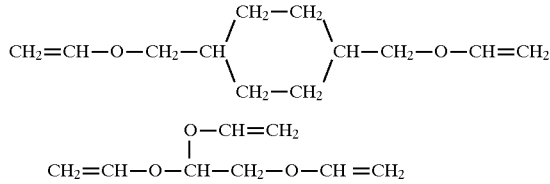

-continued

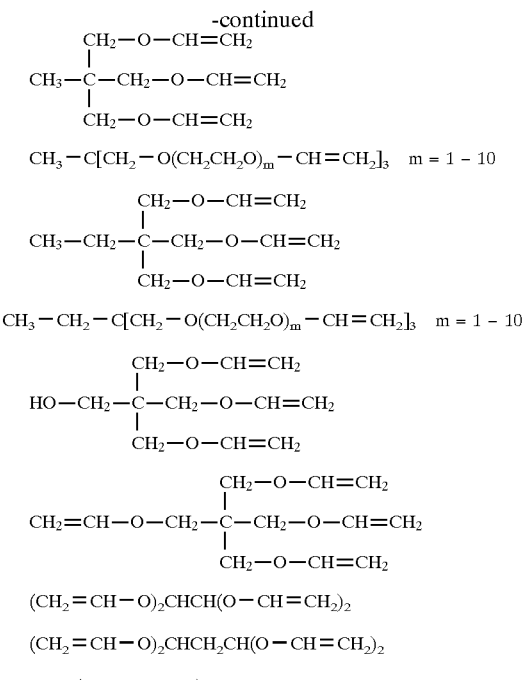

$CH_3-C[CH_2-O-CH=CH_2]_3$ structures and related.

$CH_3-C[CH_2-O(CH_2CH_2O)_m-CH=CH_2]_3$   m = 1 – 10

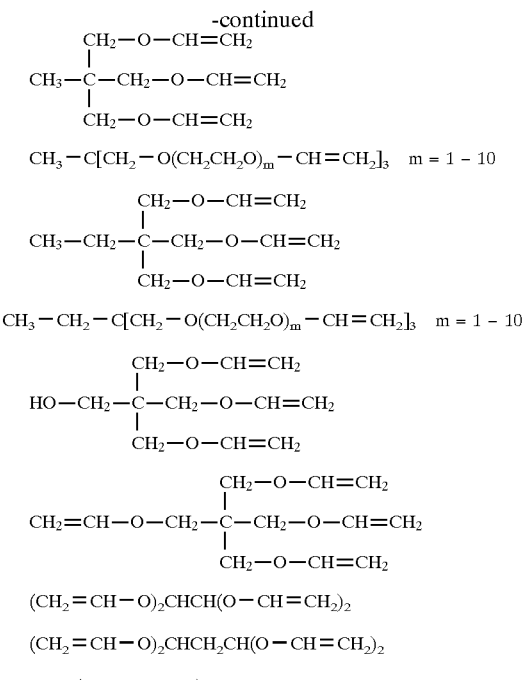

$(CH_2=CH-O)_2CHCH(O-CH=CH_2)_2$ $(CH_2=CH-O)_2CHCH_2CH(O-CH=CH_2)_2$ $CH_3C(O-CH=CH_2)_3$ $(CH_2=CH-O)CH_2[CH(O-CH=CH_2)]_3CH_2(O-CH=CH_2)$ and $(CH_2=CH-O)CH_2[CH(O-CH=CH_2)]_4CH_2(O-CH=CH_2)$ Preferred examples of the organic compound (1) are $CH_2=CH-O-(CH_2CH_2O)_3-CH=CH_2$

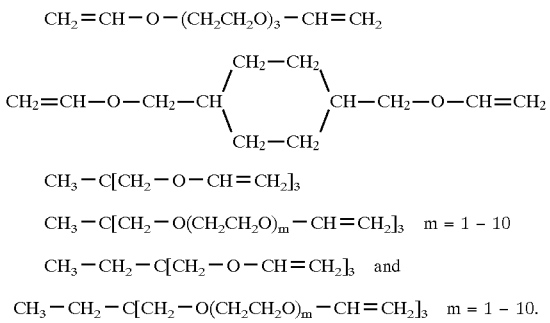

$CH_3-C[CH_2-O-CH=CH_2]_3$ $CH_3-C[CH_2-O(CH_2CH_2O)_m-CH=CH_2]_3$   m = 1 – 10

$CH_3-CH_2-C[CH_2-O-CH=CH_2]_3$ and $CH_3-CH_2-C[CH_2-O(CH_2CH_2O)_m-CH=CH_2]_3$   m = 1 – 10.

Examples of the radical Y are therefore those of the formula $-(CH_2)_2-$ $-(CH_2)_4-$ $-(CH_2CH_2O)_2-CH_2-CH_2-$ $-(CH_2CH_2CH_2CH_2O)_{n-1}CH_2CH_2CH_2CH_2-$   n = 2 – 6

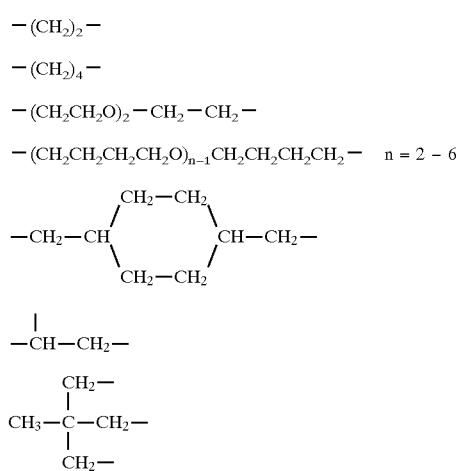

$-CH-CH_2-$ $CH_3-C(CH_2-)_3$ (branched structure with CH₂— groups)

$CH_3-C[CH_2-O(CH_2CH_2O)_{m-1}CH_2CH_2-]_3$   m = 1 – 10 branched structure $CH_3-CH_2-C(CH_2-)_3$ $CH_3-CH_2-C[CH_2-O(CH_2CH_2O)_{m-1}CH_2CH_2-]_3$   m = 1 – 10

$HO-CH_2-C(CH_2-)_3$ branched structure $-CH_2-C(CH_2-)_3$ branched structure $-CH-CH-$ $-CH-CH_2-CH-$ $CH_3C-$ $-CH_2-CH-CH-CH-CH_2-$   and $-CH_2-CH-CH-CH-CH-CH_2-$.

Processes for the preparation of the organic compound (1) are described, for example, in PCT Application WO 91/05756. The basis of the preparation is the Reppe vinylation which is known to the expert, in which alcohols are reacted catalytically with acetylene.

Typical impurities of industrial vinyl ethers are vinyl ether-alcohols, which are retained as "intermediate stages" due to incomplete vinylation, and, where appropriate, secondary products thereof formed by self-cyclisation, such as, for example:

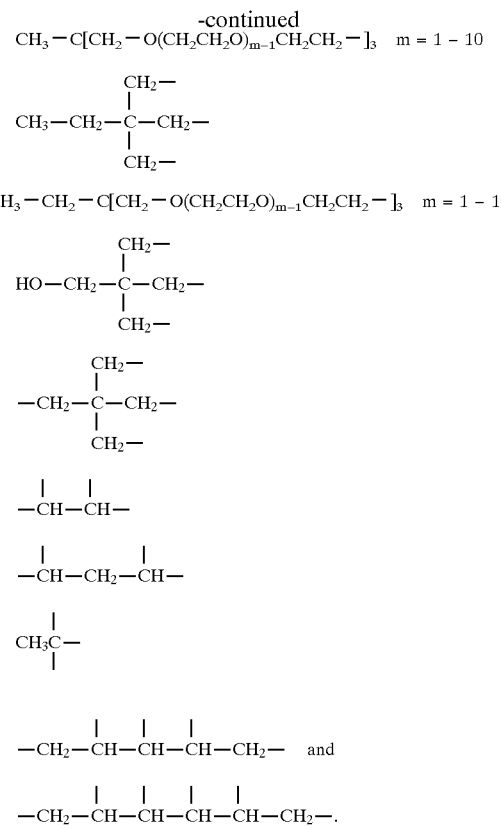

Organopolysiloxanes (2) having at least one Si-bonded hydrogen atom which are preferably employed in the process according to the invention are those of the general formula

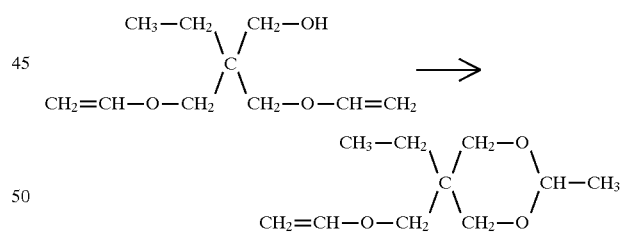

$$H_eR_fSiO_{\frac{4-(e+f)}{2}} \quad \text{(VI)}$$

wherein R has the meaning given above for this radical,
e is 0 or 1, on average 0.005 to 1.0,
f is 0, 1, 2 or 3, on average 1.0 to 2.5, and the sum of e+f is not greater than 3.

Organopolysiloxanes (2) having at least one Si-bonded hydrogen atom which are preferably employed in the process according to the invention are those of the general formula $$H_dR_{3-d}SiO(SiR_2O)_o(SiRHO)_pSiR_{3-d}H_d \quad (VII)$$

wherein R has the meaning given above for this radical,
d is identical or different and is 0 or 1,
o denotes 0 or an integer from 1 to 1000 and
p denotes 0 or an integer from 1 to 6.

The organopolysiloxanes (2) employed in the process according to the invention particularly preferably contain 2 to 6 Si-bonded hydrogen atoms per molecule.

The organopolysiloxanes (2) which have at least one Si-bonded hydrogen atom per molecule preferably have a viscosity of 0.5 to 20,000 mPa•s at 25° C., preferably 5 to 1000 mPa•s at 25° C.

Preferred examples of organopolysiloxanes of the formula (VII) are copolymers of dimethylhydridosiloxane and dimethylsiloxane units, copolymers of dimethylhydridosiloxane, dimethylsiloxane and methylhydridosiloxane units, copolymers of trimethylsiloxane and methylhydridosiloxane units and copolymers of trimethylsiloxane, dimethylsiloxane and methylhydridosiloxane units.

Processes for the preparation of organopolysiloxanes which have at least one Si-bonded hydrogen atom per molecule, including those of the preferred type, are generally known.

The organic compound (1) is employed in the process according to the invention in amounts such that the aliphatic double bond in the organic compound (1) is present in a ratio to the Si-bonded hydrogen in the organopolysiloxane (2) of preferably 1.5:1 to 20:1, preferably 2:1 to 10:1. The organic compound (1) can be combined with the organopolysiloxane (2) almost as desired within very wide limits, depending on its functionality and its molecular weight. However, a C=C:SiH ratio of greater than 20:1 leads exclusively to monohydrosilylation of the organic compound (1), which is not preferred.

The reaction of the organic compound (1), such as triethylene glycol divinyl ether, with the organopolysiloxane (2), such as α,ω-dihydridodimethylpolysiloxane, in the presence of the catalyst (3) proceeds in accordance with the following equation:

HSiMe$_2$O(SiMe$_2$O)$_n$SiMe$_2$H +

CH$_2$=CHO—(CH$_2$CH$_2$O)$_{\overline{3}}$CH=CH$_2$ ⟶

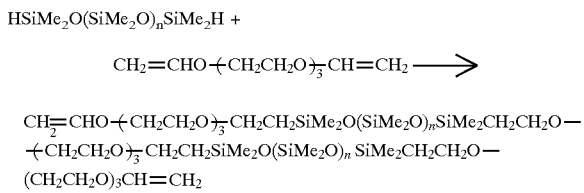

CH$_2$=CHO—(CH$_2$CH$_2$O)$_{\overline{3}}$CH$_2$CH$_2$SiMe$_2$O(SiMe$_2$O)$_n$SiMe$_2$CH$_2$CH$_2$O—
—(CH$_2$CH$_2$O)$_{\overline{3}}$CH$_2$CH$_2$SiMe$_2$O(SiMe$_2$O)$_n$SiMe$_2$CH$_2$CH$_2$O—
(CH$_2$CH$_2$O)$_3$CH=CH$_2$ The course of the reaction and therefore the resulting end product depends decisively on the ratio employed between the C=C double bond in the organic compound (1) and the Si-bonded hydrogen in the organopolysiloxane (2). Depending on the ratio of C=C:SiH employed—where the C=C:SiH ratio must always be greater than 1—siloxane copolymers which contain free vinyloxy groups of the formula

—OCH—CH$_2$ at the chain end and along the chain (for example if an organic compound (1) having more than two vinyloxy groups used) are obtained, it being possible for branchings to occur along the chain by further reaction of the free vinyloxy groups along the chain with the Si-bonded hydrogen atoms of the organopolysiloxane (2).

Catalysts (3) which promote the addition of Si-bonded hydrogen onto an aliphatic multiple bond and which can be employed in the process according to the invention are also the same catalysts which it has also been possible to employ to date for promoting addition of Si-bonded hydrogen onto an aliphatic double bond. The catalysts (3) are preferably a metal from the group of platinum metals or a compound or a complex from the group of platinum metals. Examples of such catalysts are metallic and finely divided platinum, which can be on supports, such as silicon dioxide, aluminium oxide or active charcoal, compounds and complexes of platinum, such as platinum halides, for example PtCl$_4$, H$_2$PtCl$_6$*6H$_2$O or Na$_2$PtCl$_4$*4H$_2$O, platinum-olefin complexes, platinum-alcohol complexes, platinum-alcoholate complexes, platinum-ether complexes, platinum-aldehyde complexes, platinum-ketone complexes, including reaction products of H$_2$PtCl$_6$*6H$_2$O and cyclohexanone, platinum-vinylsiloxane complexes, such as platinum-1,3-divinyl-1,1,3,3-tetra-methyldisiloxane complexes with or without a content of detectable inorganically bonded halogen, bis-(gamma-picoline)-platinum dichloride, trimethylenedipyridine-platinum dichloride, dicyclopentadiene-platinum dichloride, dimethyl sulphoxide-ethylene-platinum(II) dichloride and reaction products of platinum tetrachloride with an olefin and primary amine or secondary amine or a primary and secondary amine according to U.S. Pat. No. 4,292,434, such as the reaction product of platinum tetrachloride dissolved in 1-octene with sec-butylamine, and ammonium-platinum complexes according to EP-B 110 370, and compounds and complexes of rhodium, such as the rhodium complexes according to EP-A 476 426.

The catalyst (3) is preferably employed in amounts of 2 to 1000 ppm by weight (parts by weight per million parts by weight), preferably in amounts of 10 to 50 ppm by weight, in each case calculated as elemental platinum and based on the total weight of organic compound (1) and organopolysiloxane (2).

The process according to the invention is preferably carried out under the pressure of the surrounding atmosphere, that is to say under about 1020 hPa (absolute); but it can also be carried out under higher or lower pressures. Furthermore, the process according to the invention is preferably carried out at a temperature of 50° C. to 170° C., preferably 80° C. to 150° C.

Inert, organic solvents can be co-used in the process according to the invention, although the co-use of inert organic solvents is not preferred. Examples of inert organic solvents are toluene, xylene, octane isomers, butyl acetate, 1,2-dimethoxyethane, tetrahydrofuran and cyclohexane.

Excess organic compound (1) and any inert organic solvent which has been co-used are preferably removed by distillation from the siloxane copolymers prepared by the process according to the invention and containing vinyloxy groups.

The siloxane copolymers prepared by the process according to the invention and containing vinyloxy groups are equilibrated with an organopolysiloxane (4), if appropriate.

Organopolysiloxanes (4) which are used are preferably those chosen from the group comprising linear organopolysiloxanes containing terminal triorganosiloxy groups, of the formula R$_3$SiO(SiR$_2$O)$_x$SiR$_3$ wherein R has the meaning given above for this radical and r is 0 or an integer having a value from 1 to 1500, linear organopolysiloxanes containing terminal hydroxyl groups, of the formula HO(SiR$_2$O)$_s$H wherein R has the meaning given above for this radical and s is an integer having a value from 1 to 1500, cyclic organopolysiloxanes of the formula $(R_2SiO)_t$ wherein R has the meaning given above for this radical and t is an integer from 3 to 12, and copolymers of units of the formula $R_2SiO$ and $RSiO_{3/2}$ wherein R has the meaning given above for this radical.

The ratio of the amounts of the organopolysiloxane (4) employed in the equilibration which is to be carried out if appropriate and the siloxane copolymers containing vinyloxy groups is determined merely by the desired content of vinyloxy groups in the siloxane copolymers produced by the equilibration which is carried out if appropriate and by the desired average chain length.

Basic catalysts which promote the equilibration are preferably employed in the equilibration which is carried out if appropriate. Examples of such catalysts are alkali metal hydroxides, such as sodium hydroxide and potassium hydroxide, trimethylbenzylammonium hydroxide and tetramethylammonium hydroxide. Alkali metal hydroxides are preferred. Alkali metal hydroxides are preferably used in amounts of 50 to 10,000 ppm by weight (=parts per million), in particular 500 to 2000 ppm by weight, in each case based on the total weight of siloxane copolymer containing vinyloxy groups employed and organopolysiloxane (4) employed. Although it is possible to use acid equilibration catalysts, this is not preferred.

The equilibration which is carried out if appropriate is preferably carried out at 100° C. to 150° C. under the pressure of the surrounding atmosphere, that is to say at about 1020 hPa (absolute). If desired, however, higher or lower pressures can also be used. The equilibration is preferably carried out in a concentration of 5 to 20% by weight, based on the total weight of the particular siloxane copolymer containing vinyloxy groups employed and organopolysiloxane (4) employed, in a water-immiscible solvent, such as toluene. The catalyst can be rendered inactive before the mixture obtained in the equilibration is worked up.

The process according to the invention can be carried out batchwise, semi-continuously or completely continuously.

The siloxane copolymers according to the invention which contain vinyloxy groups can be crosslinked cationically, for example by addition of acids, such as hydrochloric acids; sulphuric acids or p-toluenesulphonic acids. The siloxane copolymers according to the invention which contain vinyloxy groups are preferably crosslinked in a cationic polymerisation initiated by light. Catalysts which are used for the crosslinking initiated by light are preferably onium salts, such as diaryliodonium salts or triarylsulphonium salts, which are known from EP-B 105 341 and the German application by the Applicant Company having the application number P 41 42 327.5. Examples of such onium salts are the bis-(dodecylphenyl)iodonium salts described in EP-B 105 341, such as bis-(dodecylphenyl)iodonium hexafluoroantimonate or bis-(dodecylphenyl)iodonium hexafluoroarsenate, or the iodonium salts of the formula

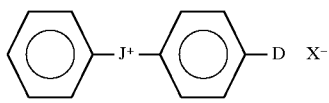

wherein D denotes a radical of the formula $-O-R^4-SiR_3^5$ wherein $R^4$ denotes a divalent hydrocarbon radical having 1 to 18 carbon atoms per radical, which is optionally interrupted by at least one oxygen atom and/or one sulphur atom and/or one carboxyl group,
$R^5$ denotes a monovalent hydrocarbon radical having 1 to 18 carbon atoms per radical, which is optionally interrupted by at least one oxygen atom, and
$X^-$ is a tosylate anion or a weakly nucleophilic or non-nucleophilic anion $Y^-$ chosen from the group comprising $CF_3CO_2^-$, $BF_4^-$, $PF_6^-$, $AsF_6^-$, $SbF_6^-$, $ClO_4^-$, $HSO_4^-$, $CF_3SO_3^-$ and $C_4F_9SO_3^-$,
which are described in the German application having the application number P 41 42 327.5.

The invention therefore relates to the use of siloxane copolymers containing vinyloxy groups, preferably comprising units of the formula (I), (II) and if appropriate at least one of the units of the formula (III), (IV) or (V), preferably comprising units of the formulae (I'), (II') and (III'), in compositions which can be crosslinked by light and are based on the above-mentioned siloxane copolymers.

The siloxane copolymers according to the invention which contain vinyloxy groups are preferably crosslinked by ultraviolet light, that having wavelengths in the range from 200 to 400 nm being preferred. The ultraviolet light can be generated, for example, in xenon or low, medium or high pressure mercury lamps. Ultraviolet light having a wavelength of 400 to 600 nm, that is to say so-called "halogen light" is also suitable for the crosslinking by light. The siloxane copolymers according to the invention which contain vinyloxy groups can be crosslinked by light in the visible range if commercially available photosensitisers are also used.

The cationic polymerisation of the siloxane copolymers according to the invention which contain vinyloxy groups can of course also be initiated by Brönsted or Lewis acids customary for this purpose.

Finally, the invention also relates to the use of the siloxane copolymers according to the invention which contain vinyloxy groups for the production of coatings which can be crosslinked by light.

The siloxane copolymers according to the invention which contain vinyloxy groups can be used in radiation-curing printing inks.

Examples of surfaces onto which the coatings according to the invention can be applied are those of paper, wood, cork, films of plastic, for example polyethylene films or polypropylene films, ceramic objects, glass, including glass fibres, metals, pasteboard, including that of asbestos, and woven and non-woven cloth of naturally occurring or synthetic organic fibres.

The application of the siloxane copolymers according to the invention which contain vinyloxy groups to the surfaces to be coated can be carried out in any desired manner which is suitable and in many cases known for the production of coatings from liquid substances, for example by dipping, brushing, pouring, spraying, rolling, printing, for example by means of an offset gravure coating device, or knife or doctor blade coating.

EXAMPLE 1

238 g of a copolymer of hydridodimethylsiloxane and dimethylsiloxane units having a viscosity of 11 mm$^2$/s at 25° C., corresponding to 0.5 g of Si-bonded hydrogen, together with 78.5 g of the vinyl ether of the formula

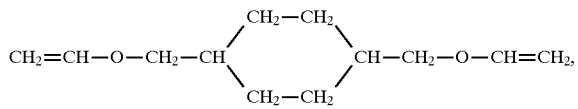

obtainable from GAF Chem. Corp. under the trade name Rapi-Cure CHVE, are heated at 50° C. under a nitrogen atmosphere. 4 mg of platinum are added in the form of a solution of H$_2$PtCl$_6$xH$_2$O in isopropanol, after which the temperature of the reaction mixture rises to about 130° C. The mixture is allowed to react at this temperature for a further hour, a conversion of more than 99% being achieved. 315 g of a copolymer which comprises alternating siloxane and aliphatic ether blocks and has a viscosity of 90 nm$^2$/s at 25° C. are obtained. In accordance with the preparation method, the linear block copolymer contains vinyl ether end groups, the average molecular weight being 1900. The product has a surface tension of 22 mN.m$^{-1}$.

EXAMPLE 2

336 g of of an α,ω-dihydridodimethylpolysiloxane having a content of 0.149% of Si-bonded hydrogen are mixed under turbulent conditions with 67 g of triethylene glycol divinyl ether (obtainable under the trade name Rapi-Cure DVE-3 from GAF Corp.) and the mixture is heated to about 80° C. A solution of 14 mg of platinum tetrachloride in a little 1-octene is added under a nitrogen atmosphere, after which the mixture heats up to 135° C. This temperature is maintained for a further hour and the mixture is cooled. In accordance with the synthesis, the product has the structure of a linear block copolymer of dimethylpolysiloxane and polyglycol chains having 2-vinyl ether end groups. The viscosity at 25° C. is 235 mm$^2$/s, and the average molecular weight is about 6000. The siloxane content is about 83% by weight (from the $^1$H-NMR spectrum).

EXAMPLE 3

403 g of α,ω-dihydridodimethylpolysiloxane having a total of 0.25 g of Si-bonded hydrogen are mixed with 42 g of triethylene glycol divinyl ether (obtainable under the trade name Rapi-Cure DVE-3 from GAF Corp.) at 90° C. under nitrogen. 24 mg of hexachloroplatinic acid dissolved in a little isopropanol are added. After the internal temperature has risen, the mixture is allowed to react at 130° C. for another 3 hours, until a conversion of more than 99% is reached. Volatile constituents are removed at 100° C. under 5 hPa, after which a clear oil having a viscosity of 220 mm$^2$/s at 25° C. is obtained. The structure in principle corresponds to the polymer product from Example 2; the siloxane chain length is now greater but the dimethylpolysiloxane chains alternate less often with the polyglycol chains. The siloxane content is now 91% by weight, at about the same average molecular weight.

EXAMPLE 4

170 g of copolymer of trimethylsiloxane, dimethylsiloxane and hydridomethylsiloxane units having a viscosity of 90 mm$^2$/s at 25° C. and a total of 80 mg of Si-bonded hydrogen are mixed with 29.5 g of the vinyl ether Rapi-Cure CHVE, which is described in Example 1, and 4 mg of platinum in the form of a solution of PtCl$_4$ in 1-octene. The mixture is heated at 120° C. under nitrogen for 3 hours, volatile contents are stripped off under 5 hPa, and a clear oil having a viscosity of 280 mm$^2$/s at 25° C. is obtained. The copolymer has a branched structure, siloxane chains being bridged by aliphatic ethers and at the same time having lateral vinyl ether groups. It contains about 0.3 mol of vinyl ether double bonds per kg.

EXAMPLE 5

170 g of copolymer of trimethylsiloxane, dimethylsiloxane and hydridomethylsiloxane units having a viscosity of 90 mm$^2$/s at 25° C. are mixed with 20 g of the vinyl ether Rapi-Cure DVE-3, which is described in Example 2, and the mixture is heated to 100° C. under a nitrogen atmosphere. After addition of 10 mg of H$_2$PtCl$_6$ x H$_2$O, dissolved in a little isopropanol, the internal temperature rises to just about 120° C., where it is kept for a further 3 hours. After removal of volatile constituents in vacuo under 5 hPa, 175 g of a branched block copolymer of siloxane chains with polyglycol bridges and SiC-bonded vinyl ether groups are obtained after filtration. The polymer product has a viscosity of 1200 mm$^2$/s at 25° C. and about 0.25 mol of vinyl ether double bonds per kg.

EXAMPLE 6

4 mg of platinum in the form of a platinum-1,3-divinyl-1,1,3,3-tetramethyldisiloxane complex are added to 202 g of the vinyl ether Rapi-Cure DVE-3, which is described in Example 2, and the mixture is heated to 90° C. under a nitrogen atmosphere. A total of 69 g of 1,3-dihydridotetramethyldisiloxane are metered in over a period of about 1.5 hours, and the reaction is brought to completion at about 130° C. After removal of volatile compounds at 160° C. under 5 hPa, a polymeric difunctional vinyl ether having a viscosity of 44 mm$^2$/s at 25° C. is obtained in a quantitative yield. It can be seen from the $^1$H-NMR spectrum that the C=C/SiCH$_2$ ratio has a value of 0.61. The product contains 2.6 mol of vinyl ether double bonds per kg. It has a surface tension of 28 mN.m$^{-1}$.

EXAMPLE 7

To prepare a vinyl ether/siloxane copolymer branched via the ether blocks, Example 1 is repeated with 100 g of trimethylolpropane trivinyl ether instead of the divinyl ether used therein. After the end of the hydrosilylation reaction, the excess vinyl ether is removed at 160° C. under 3 hPa, after which a clear oil having a viscosity of 145 mm$^2$/s at 25° C. is obtained. The branched block copolymer contains divinyl ether end groups and a siloxane content of 76% by weight. It contains about 1.6 mol of vinyl ether double bonds per kg.

EXAMPLE 8

10 g of the block copolymer prepared in Example 6 are mixed with 0.1 g of [4-[2-(3-dioctylmethylsilylpropyloxy)ethoxy]phenyl]-iodonium hexafluoroantimonate (preparation described in the German application having the application number P 41 42 327.5) at 22° C. and the mixture is applied in a thin layer of about 4 μm to polyethylene-coated paper using a glass rod. After an exposure time of 0.15 second using a medium pressure mercury lamp (80 watt/cm) at a distance of 10 cm, the block copolymer has hardened to an abrasion-resistant product.

EXAMPLE 9

170 g of the copolymer used in Example 4 are mixed together with 17 g of butane-1,4-diol divinyl ether, inhibited with 100 ppm of KOH, and 2 mg of platinum in the form of its 1,3-divinyltetramethylsiloxane complex, and the mixture is heated to 136° C. After a reaction time of 3 hours under nitrogen, more than 97% of the active hydrogen groups have been consumed, after which excess divinyl ether is removed at 160° C. under 5 hPa. A branched copolymer of aliphatic ether units and siloxane blocks having a viscosity of 330 mm$^2$.s$^{-1}$ at 25° C. is obtained. It contains about 0.27 mol of vinyl ether double bonds per kg.

We claim:

1. Siloxane copolymers containing vinyloxy groups and comprising (a) siloxane units of the formula $$R_a Si(OR^1)_b O_{\frac{4-(a+b)}{2}} \quad (I)$$

wherein

R denotes identical or different, optionally halogenated hydrocarbon radicals having 1 to 18 carbon atoms per radical, $R^1$ denotes identical or different alkyl radicals having 1 to 4 carbon atoms per radical, and optionally contains an ether linkage within the $R^1$ radical, a is 0, 1, 2 or 3, b is 0, 1, 2 or 3 and the sum of a+b is not greater than 3, (b) at least one unit per molecule chosen from the group consisting of units of the formula $$GR_c SiO_{\frac{4-(c+1)}{2}} \quad (II)$$

$$O_{\frac{4-(c+1)}{2}} R_c Si - G^1 - SiR_c O_{\frac{4-(c+1)}{2}} \quad (III)$$

$$O_{\frac{4-(c+1)}{2}} R_c Si - G^2 - SiR_c O_{\frac{4-(c+1)}{2}} \quad (IV)$$
$$\qquad\qquad\qquad | $$
$$\qquad\qquad SiR_c O_{\frac{4-(c+1)}{2}}$$

and $$\qquad\qquad SiR_c O_{\frac{4-(c+1)}{2}}$$
$$\qquad\qquad\qquad | $$
$$O_{\frac{4-(c+1)}{2}} R_c Si - G^2 - SiR_c O_{\frac{4-(c+1)}{2}} \quad (V)$$
$$\qquad\qquad\qquad | $$
$$\qquad\qquad SiR_c O_{\frac{4-(c+1)}{2}}$$

wherein

R has the meaning given above c is 0, 1 or 2,

G denotes a radical of the formula $$-CH_2CH_2OY(OCH=CH_2)_{x-1}$$

wherein

Y denotes a divalent, trivalent, tetravalent, pentavalent or hexavalent hydrocarbon radical having 1 to 20 carbon atoms per radical, and is optionally substituted by groups of the formula —OH, —OR$^2$, $$-OSiR^3{}_3 - OCR^2$$
$$\qquad\qquad\quad \|$$
$$\qquad\qquad\quad O$$

or —X or is optionally interrupted by at least one oxygen atom, one carboxyl or one carbonyl group, and x is 2, 3, 4, 5 or 6, $G^1$ denotes a radical of the formula $$\qquad\qquad (OCH=CH_2)_{x-2}$$
$$\qquad\qquad\qquad |$$
$$-CH_2CH_2O-Y-OCH_2CH_2-,$$

$G^2$ denotes a radical of the formula $$\qquad\qquad (OCH=CH_2)_{x-3}$$
$$\qquad\qquad\qquad |$$
$$-CH_2CH_2O-Y-OCH_2CH_2-,$$
$$\qquad\qquad\qquad |$$
$$\qquad\qquad OCH_2CH_2-$$

and $G^3$ denotes a radical of the formula $$\qquad\qquad (OCH=CH_2)_{x-4}$$
$$\qquad\qquad\qquad |$$
$$-CH_2CH_2O-Y-OCH_2CH_2-,$$
$$\qquad\qquad\qquad |$$
$$\qquad\qquad (OCH_2CH_2-)_2$$

wherein Y and x have the meaning given above for these symbols and the siloxane copolymers containing vinyloxy groups are liquids which crosslink when exposed to ultraviolet light.

2. Siloxane copolymers containing vinyloxy groups, according to claim 1, characterized in that the siloxane units of the formula (I) contain, per molecule, at least one siloxane unit of the formula (II) and, per molecule, at least one unit selected from the group consisting of units of the formulae (III), (IV) and (V).

3. Siloxane copolymers containing vinyloxy groups, according to claim 1, characterized in that they comprise (a) siloxane units of the formula $$R_2 SiO \quad (I')$$

(b) per molecule, at least two siloxane units of the formula $$GR_2 SiO_{1/2} \quad (II')$$

(c) and per molecule, at least one unit of the formula $$O_{1/2} R_2 SiG^1 SiR_2 O_{1/2} \quad (III')$$

wherein

R denotes identical or different, optionally halogenated hydrocarbon having 1 to 18 carbon atoms per radical, G denotes a radical of the formula $$-CH_2CH_2OY(OCH=CH_2)_{x-1}$$

and $G^1$ denotes a radical of the formula $$\qquad\qquad (OCH=CH_2)_{x-2}$$
$$\qquad\qquad\qquad |$$
$$-CH_2CH_2O-Y-OCH_2CH_2-,$$

wherein

Y denotes a divalent, trivalent, tetravalent, pentavalent or hexavalent hydrocarbon radical having 1 to 20 carbon atoms per radical, and is optionally substituted by groups of the formula

—OH$_4$

—OR$^2$ wherein R$_2$ denotes an alkyl radical having 1 to 6 carbon atoms per radical, —OSiR$^3{}_3$ wherein R$^3$ denotes a methyl, ethyl, isopropyl, tert-butyl or phenyl radical, —$OCR^2$ wherein $R^2$ has the meaning given above for this radical or —X wherein X denotes a halogen atom or is optionally interrupted by at least one oxygen atom, one carboxyl or one carbonyl group, and x denotes 2, 3, 4, 5 or 6.

4. A process for the preparation of siloxane copolymers containing vinyloxy groups, where an organic compound (1) containing more than one vinyloxy group, of the general formula $$Y(OCH=CH_2)_x \qquad (I)$$

wherein

Y denotes a divalent, trivalent, tetravalent, pentavalent or hexavalent hydrocarbon radical having 1 to 20 carbon atoms per radical, and is optionally substituted by groups of the formula

—OH

—$OR^2$ wherein $R_2$ denotes an alkyl radical having 1 to 6 carbon atoms per radical —$OSiR^3{}_3$ wherein $R^3$ denotes a methyl, ethyl, isopropyl, tert-butyl or phenyl radical $$\begin{array}{c} -OCR^2 \\ \parallel \\ O \end{array}$$

wherein $R^2$ has the meaning given above for this radical or

—X wherein X denotes a halogen atom, or is optionally interrupted by at least one oxygen atom, one carboxyl or one carbonyl group, and x is 2, 3, 4, 5 or 6, is reacted with an organopolysiloxane (2) having at least one Si-bonded hydrogen atom per molecule of the general formula $$H_eR_fSiO_{\frac{4-(e+f)}{2}} \qquad (VI)$$

wherein

R is identical or different, optionally halogenated hydrocarbon radicals, e is 0 or 1, and f is 0, 1, 2 or 3, with the proviso that the sum of e+f is not greater than 3, in the presence of a catalyst (3) which promotes the addition of Si-bonded hydrogen onto an aliphatic double bond, the ratio of aliphatic double bond in the organic compound (1) to Si-organic compound (1) to Si-bonded hydrogen in the organopolysiloxane (2) is such that liquid siloxane copolymers containing vinyloxy groups, having on average at least one vinyloxy group of the formula

—$OCH=CH_2$ which crosslink when exposed to ultraviolet light are obtained.

5. A process according to claim 4, wherein the organic compounds are selected from the group consisting of, $$CH_2=CH-O-(CH_2CH_2O)_3-CH=CH_2,$$

$$CH_2=CH-O-CH_2-CH\underset{CH_2-CH_2}{\overset{CH_2-CH_2}{\diagdown}}CH-CH_2-O-CH=CH_2,$$

and $$CH_3-CH_2-O(CH_2-O-CH=CH_2)_3.$$

6. Process according to claim 4, characterized in that the organopolysiloxane (2) having at least one Si-bonded hydrogen atom per molecule which is used is one of the general formula $$H_dR_{3-d}SiO(SiR_2O)_o(SiRHO)_pSiR_{3-d}H_d \qquad (VII)$$

wherein R denotes identical or different, optionally halogenated hydrocarbon radicals with 1 to 18 carbon atom(s) per radical, d is identical or different and is 0 or 1, o denotes 0 or an integer from 1 to 1000 and p denotes 0 or an integer from 1 to 6.

7. Process according to claim 4, wherein the resulting siloxane copolymer containing vinyloxy groups is further equilibrated with an organopolysiloxane (4) chosen from the group consisting of linear organopolysiloxanes containing terminal triorganosiloxy groups, linear organopolysiloxanes containing terminal hydroxyl groups, cyclic organopolysiloxanes and copolymers of diorganosiloxane and monoorganosiloxane units.

8. A composition which is crosslinkable by light comprised of the siloxane copolymers as claimed in claim 1.

* * * * *

UNITED STATES PATENT AND TRADEMARK OFFICE
CERTIFICATE OF CORRECTION

PATENT NO. : 5,866,666
DATED : February 2, 1999
INVENTOR(S) : Christian Herzig et al.

It is certified that error appears in the above-identified patent and that said Letters Patent is hereby corrected as shown below:

Column 14, line 63, Claim 3, delete "$OH_4$" and insert --OH,--.

Signed and Sealed this

Tenth Day of August, 1999

Attest:

Attesting Officer

Q. TODD DICKINSON

Acting Commissioner of Patents and Trademarks